(12) United States Patent
Wolfram

(10) Patent No.: US 9,594,737 B2
(45) Date of Patent: Mar. 14, 2017

(54) NATURAL LANGUAGE-AIDED HYPERTEXT DOCUMENT AUTHORING

(71) Applicant: WOLFRAM ALPHA LLC, Champaign, IL (US)

(72) Inventor: Stephen Wolfram, Concord, MA (US)

(73) Assignee: Wolfram Alpha LLC, Champaign, IL (US)

( * ) Notice: Subject to any disclaimer, the term of this patent is extended or adjusted under 35 U.S.C. 154(b) by 408 days.

(21) Appl. No.: 14/101,004

(22) Filed: Dec. 9, 2013

(65) Prior Publication Data

US 2015/0161085 A1 Jun. 11, 2015

(51) Int. Cl.
G06F 17/22 (2006.01)
G06F 17/24 (2006.01)
G06F 17/30 (2006.01)
G06F 17/27 (2006.01)

(52) U.S. Cl.
CPC ......... G06F 17/24 (2013.01); G06F 17/2247 (2013.01); G06F 17/27 (2013.01); G06F 17/3089 (2013.01); G06F 17/30943 (2013.01)

(58) Field of Classification Search
CPC ...... G06F 17/24; G06F 17/3089; G06F 17/27; G06F 17/30943; G06F 17/2247
See application file for complete search history.

(56) References Cited

U.S. PATENT DOCUMENTS

| 5,930,746 | A | * | 7/1999 | Ting | G06F 17/271 704/2 |
| 6,173,441 | B1 | * | 1/2001 | Klein | G06F 8/41 704/9 |
| 6,314,415 | B1 | | 11/2001 | Mukherjee | |
| 6,604,075 | B1 | | 8/2003 | Brown et al. | |
| 7,027,975 | B1 | * | 4/2006 | Pazandak | G10L 15/30 704/9 |
| 7,231,343 | B1 | * | 6/2007 | Treadgold | G06F 17/2785 704/9 |
| 7,613,719 | B2 | * | 11/2009 | Chang | G06F 17/30401 |
| 7,873,657 | B2 | * | 1/2011 | Roche | G06F 17/30864 704/9 |
| 8,176,120 | B2 | | 5/2012 | Rosenstein et al. | |
| 8,375,294 | B2 | | 2/2013 | Toebes et al. | |
| 8,442,812 | B2 | | 5/2013 | Ehsani et al. | |
| 8,589,869 | B2 | | 11/2013 | Wolfram | |
| 8,788,524 | B1 | | 7/2014 | Wolfram et al. | |
| 8,966,439 | B2 | | 2/2015 | Wolfram | |

(Continued)

*Primary Examiner* — Maikhanh Nguyen

(57) ABSTRACT

Natural language (NL) processing of NL commands is performed to determine one or more of (i) content to be included in a hypertext document, (ii) a layout for the hypertext document, or (iii) parameters corresponding to behavior of the hypertext document. Performing the NL processing includes: determining assumptions concerning one or both of (a) ambiguities associated with the NL commands or (b) information necessary for creating the hypertext document not specified by the NL commands. The assumptions correspond to the one or more of (i) content to be included in the hypertext document, (ii) the layout for the hypertext document, or (iii) the parameters corresponding to behavior of the hypertext document. Hypertext document code or data for displaying the hypertext document is generated based on the NL processing of the NL commands including the determined assumptions.

14 Claims, 14 Drawing Sheets

(56) References Cited

U.S. PATENT DOCUMENTS

| | | | |
|---|---|---|---|
| 9,069,814 B2 | 6/2015 | Wolfram et al. | |
| 9,213,768 B1 | 12/2015 | Wolfram et al. | |
| 2002/0095411 A1 | 7/2002 | Caldwell et al. | |
| 2003/0110040 A1* | 6/2003 | Holland | G10L 15/26 704/275 |
| 2005/0210061 A1* | 9/2005 | Chang | G06F 17/30401 |
| 2007/0162845 A1 | 7/2007 | Cave et al. | |
| 2007/0168465 A1 | 7/2007 | Toppenberg et al. | |
| 2007/0186156 A1* | 8/2007 | Bagare | G06F 8/30 715/234 |
| 2007/0204216 A1 | 8/2007 | Morgan | |
| 2008/0235257 A1 | 9/2008 | Berens | |
| 2009/0094137 A1 | 4/2009 | Toppenberg et al. | |
| 2009/0132506 A1* | 5/2009 | Houck | G06F 17/30976 |
| 2010/0004924 A1* | 1/2010 | Paez | G06F 17/30654 704/9 |
| 2010/0251143 A1* | 9/2010 | Thomas | G06F 17/3089 715/760 |
| 2011/0115702 A1* | 5/2011 | Seaberg | G06F 3/017 345/156 |
| 2012/0311424 A1* | 12/2012 | Bobykin | G06F 17/3089 715/221 |
| 2013/0103391 A1* | 4/2013 | Millmore | G06F 17/27 704/9 |
| 2013/0125094 A1 | 5/2013 | Wolfram et al. | |
| 2013/0204610 A1 | 8/2013 | Wu | |
| 2014/0156282 A1* | 6/2014 | Madere | G06F 17/27 704/275 |
| 2015/0019203 A1* | 1/2015 | Smith | G06F 17/30796 704/9 |

\* cited by examiner

FIG. 3A  ← 300
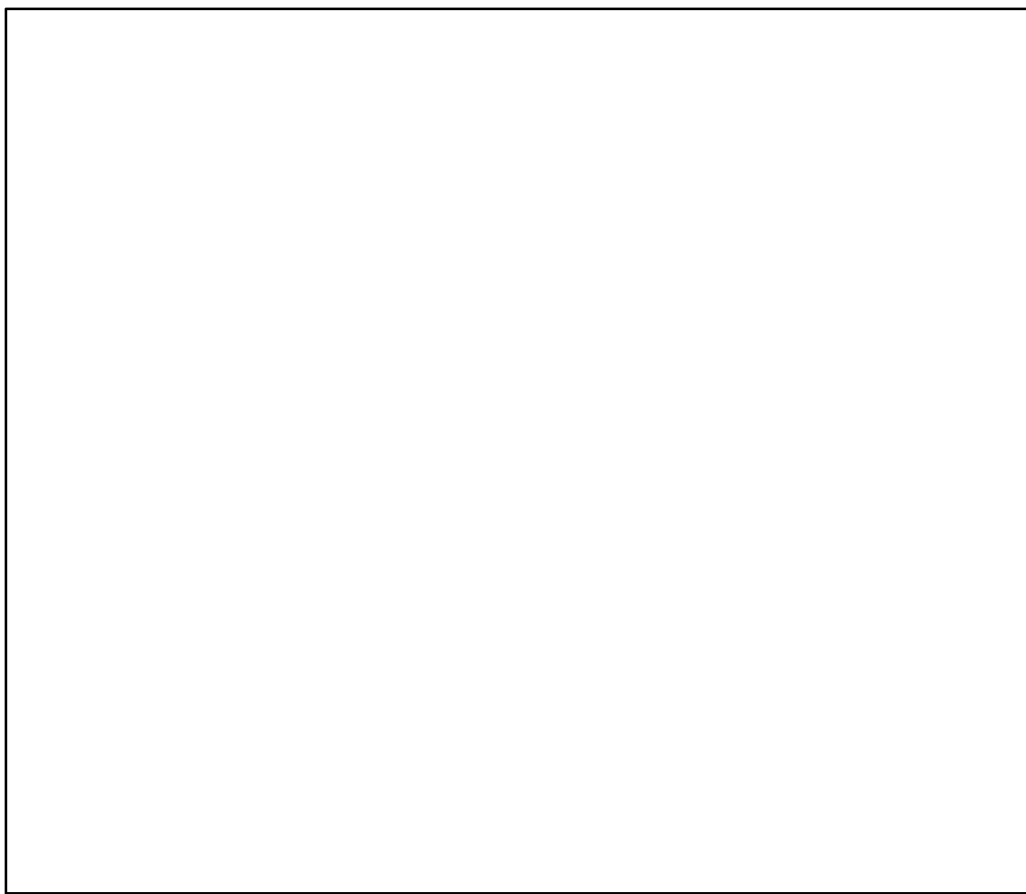

```
<!DOCTYPE HTML PUBLIC "-//W3C//DTD HTML 4.01 Transitional//EN">
<html>
    <body>
        <h1> My Search Page </h1>
        <input type=text id=searchbox/>
        <input type=button value=Go/>
    </body>
</html>
```

```
$(function(){
        $("input").focus;
});
```

```
window onload = function{
        document.getElementsByTagName("input").focus();
}
```

<input type=text id=searchbox autofocus/>

← 600 body{
    background:blue;
}

$("body").CSS( "background", "blue");

<body style="background:blue">

```
$("input").on('click',function(event){
        $.post('http://myserver.com/someurl', value:$("input").val()});
```

```
<table>
        <tr><td></td><td></td><td></td></tr>
        <tr><td></td><td></td><td></td></tr>
        <tr><td></td><td></td><td></td></tr>
        <tr><td></td><td></td><td></td></tr>
        <tr><td></td><td></td><td></td></tr>
        <tr><td></td><td></td><td></td></tr>
        <tr><td></td><td></td><td></td></tr>
        <tr><td></td><td></td><td></td></tr>
</table>
```

<p>Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.</p>

NATURAL LANGUAGE-AIDED HYPERTEXT DOCUMENT AUTHORING

FIELD OF THE DISCLOSURE

The present disclosure generally relates to systems that enable generation of hypertext language documents, such as web pages, using natural language input.

BACKGROUND

Web documents may contain content, markup language (e.g., Hypertext Markup Language (HTML), Extensible Hypertext Markup Language (XHTML), Extensible Markup Language (XML), etc.) elements, stylesheets (e.g., Cascading Style Sheets (CSS)), scripts (e.g., JAVASCRIPT®, etc.). Markup language elements and scripting language statements must be written in a precise syntax so that a web browser can correctly render the corresponding web pages. When there are errors in the syntax of the markup language elements and/or scripting language statements, the web browser may not interpret the markup language elements and/or scripting language statements correctly, and/or may render a web page in a manner that was not intended by the author of the markup language file. For a novice, learning the correct syntax of web page code is burdensome and time consuming. Even for an experienced designer, creation of a web page that works correctly across myriad web browsers, operating systems, and devices is often very time consuming.

WYSIWYG (what you see is what you get) website builders are tools that provide a visual interface for website design; that is, the user of a WYSIWYG website builder is not required to learn code. Such website builders have a gentle learning curve and allow novices to build a website and get it running live on the Internet quickly. Website builders, however, are inflexible and have limitations with respect to creating web pages that differ from a fixed set of templates. Additionally, the code automatically generated by website builders is often inefficient, non-semantic, and/or invalid. For example, Microsoft Frontpage and Adobe Dreamweaver are WYSIWYG web editors whose generated source code output may be neither human-readable nor human-editable.

On the other hand, web editors are tools to facilitate manual construction of websites, and are highly flexible as compared to website builders. Web editors, however, typically require users to have significant knowledge of web page coding and languages (e.g., HTML, XML, CSS, JAVASCRIPT®, etc.).

SUMMARY OF THE DISCLOSURE

In some embodiments, a method of creating or modifying a hypertext document, comprises receiving, at one or more computer processors, natural language (NL) commands describing one or more of (i) content of the hypertext document, (ii) a layout of the hypertext document, or (iii) behavior of the hypertext document; and performing, at one or more computer processors, NL processing of the NL commands to determine one or more of (i) content to be included in the hypertext document, (ii) a layout for the hypertext document, or (iii) parameters corresponding to behavior of the hypertext document. Performing the NL processing includes: determining, at one or more computer processors, assumptions concerning one or both of (a) ambiguities associated with the NL commands or (b) information necessary for creating the hypertext document not specified by the NL commands, wherein the assumptions correspond to the one or more of (i) content to be included in the hypertext document, (ii) the layout for the hypertext document, or (iii) the parameters corresponding to behavior of the hypertext document; and generating, at one or more computer processors, hypertext document code or data for displaying the hypertext document, wherein generating the hypertext document code or data is based on the NL processing of the NL commands including the determined assumptions.

In another embodiment, a system comprises one or more processing devices configured to perform the method of the previous paragraph. In another embodiment, machine readable instructions that, when executed by one or more processing devices, cause the one or more processing devices to perform the method of the previous paragraph are stored on one or more computer readable media.

In yet another embodiment, a method of modifying a hypertext document includes receiving, at one or more computer processors, natural language (NL) commands describing one or more of (i) a change of content of the hypertext document, (ii) a change of layout of the hypertext document, or (iii) a change of behavior of the hypertext document; and performing, at one or more computer processors, NL processing of the NL commands to determine one or more of (i) content to be included in the hypertext document or content in the hypertext document to be modified, (ii) a change to a layout of the hypertext document, or (iii) a change of parameters corresponding to behavior of the hypertext document. Performing the NL processing includes determining, at one or more computer processors, assumptions concerning one or both of (a) ambiguities associated with the NL commands or (b) information necessary for modifying the hypertext document not specified by the NL commands, wherein the assumptions correspond to the one or more of (i) content to be included in the hypertext document or content in the hypertext document that is to be modified, (ii) the change of the layout for the hypertext document, or (iii) the change of the parameters corresponding to behavior of the hypertext document; and modifying, using one or more computer processors, hypertext document code or data in the hypertext document, wherein modifying the hypertext document code or data is based on the NL processing of the NL commands including the determined assumptions.

In another embodiment, a system comprises one or more processing devices configured to perform the method of the previous paragraph. In another embodiment, machine readable instructions that, when executed by one or more processing devices, cause the one or more processing devices to perform the method of the previous paragraph are stored on one or more computer readable media.

BRIEF DESCRIPTION OF THE DRAWINGS

FIGS. 3A-3F depict an illustrative example of a web page being created using a system such as the system of FIG. 1, according to an embodiment.

FIG. 5A is an example of jQuery JavaScript code that may be generated by the system of FIG. 1 in response to an NL command, according to an embodiment.

FIG. 5B is an example of vanilla JavaScript code that may be generated by the system of FIG. 1 in response to an NL command, according to an embodiment.

FIG. 5C is an example of HTML code that may be generated by the system of FIG. 1 in response to an NL command, according to an embodiment.

FIG. 6A is an example of jQuery JavaScript code that may be generated by the system of FIG. 1 in response to an NL command, according to an embodiment.

FIG. 6B is an example of vanilla JavaScript code that may be generated by the system of FIG. 1 in response to an NL command, according to an embodiment.

FIG. 6C is an example of HTML code that may be generated by the system of FIG. 1 in response to an NL command, according to an embodiment.

FIG. 9 is an example of HTML code that may be generated by the system of FIG. 1 in response to an NL command, according to an embodiment.

FIG. 10 is an example of HTML code that may be generated by the system of FIG. 1 in response to an NL command, according to an embodiment.

DETAILED DESCRIPTION

Figure 1:
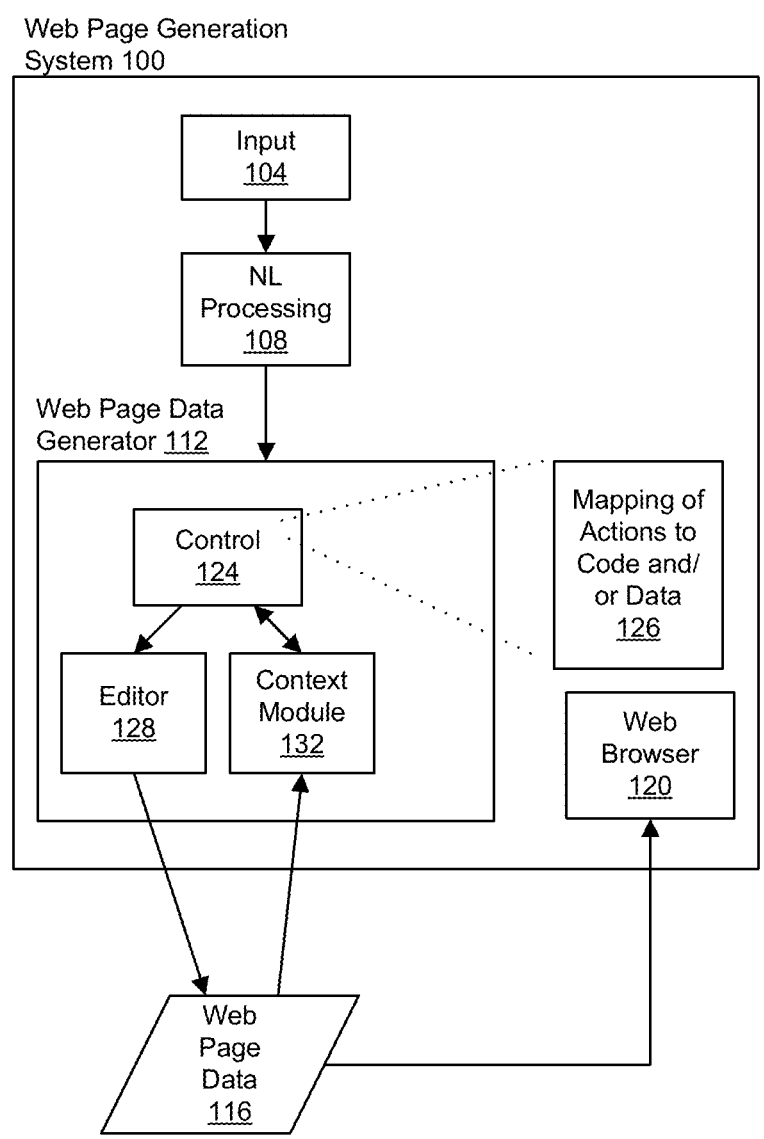
FIG. 1 is a diagram of an example system for facilitating web page creation and/or modification using natural language (NL) commands from a user, according to an embodiment.

FIG. 1 is a diagram of an example system 100 for facilitating web page creation and/or modification using natural language (NL) commands from a user, according to an embodiment. The system 100 may be implemented on a single computer, by a network of computers, in a client-server system, etc., as will be described in more detail below. The system 100 is configured to perform NL processing of the NL commands to determine one or more of (i) content to be included in a web page, (ii) a layout for the web page, (iii) parameters corresponding to behavior of the web page, etc., in some embodiments.

The system of FIG. 1, and other methods, techniques, systems, are described with respect to web pages merely for purposes of illustration. Similar systems, techniques, etc., may be utilized to create and/or modify other types of hypertext documents.

The system 100 includes an input module 104 for receiving NL commands from a user. For example, the system 100 may be configured to generate a graphical user interface (GUI) having a text box, in some embodiments, and the input module 104 may be configured to receive NL commands from the text box. As another example, the input module 104 may be configured to receive NL commands that were generated from an audio input, in some embodiments. For example, a user computer may include an audio input device coupled to a speech recognition system, and the input module 104 may be configured to receive NL commands from the speech recognition system. The input module 104 may provide elementary error and consistency checking, for example, to help ensure that at least a minimum input is present or prompting a user with an error when a length limit is exceeded.

The system 100 also includes an NL processing module 108 configured to analyze and process NL commands received via the input module 104. The NL processing module 108 may include a parser configured to examine an input to extract keywords, group words into phrases, identify numerical expressions, categorize data, etc., for example. In some embodiments, the parser may perform an initial go/no go analysis on the keywords, phrases, or numerical expressions to determine if there is enough information to proceed to a further step. When there is not enough information to make even a cursory pass at further analysis, the parser may cause the user to be prompted for additional information such as information that may clarify the formula desired by the user. Alternatively, the system 100 may generate a message that the system 100 cannot interpret the input.

In some embodiments, the parser may take an initial input and create tokens, and then assemble the tokens into one or more expressions in a precise syntax. In some embodiments, the parser may perform additional processing such as attempting to identify phrases, attempting to rearrange tokens to see if the rearrangements match something that the parser understands, such as a phrase. For instance, the parser may utilize algorithmic rearrangements of the input. Also, in some embodiments, the parser may cause the user to be prompted to rephrase the input. Then, the parser may analyze the original input in conjunction with the rephrased input. Further, the parser may utilize machine learning techniques to identify language processing algorithms that work better than others, in some embodiments.

The one or more expressions generated by the parser may be provided to a web page data generator 112. The web page data generator 112 is configured to apply the one or more expressions generated by the parser and determine one or more actions to be performed on a web page data document 116, such as generating and adding web page data to the document 116, or modifying existing web page data in the document 116. The web page data 116 may include content, markup language elements, stylesheets, and/or scripting language statements corresponding to one or more web pages. For example, a web browser may render a web page using the web page data 116, in some embodiments and/or implementations. As another example, a web server may use the web page data 116 to dynamically generate web pages that, in turn, may be rendered by a web browser.

In some embodiments, the web page generation system 100 may include a web browser 120 configured to render one or more web pages corresponding to the web page data 116, and the rendered web page(s) may be displayed on a display device communicatively coupled to the web page generation system 100. This may be useful, for example, to enable a user to visualize the web page(s) that results from the current web page data 116, visualize how changes to the web page data 116 affect the resulting web page(s), etc. Similarly, in some embodiments, the web page generation system 100 may include web server functionality associated with generating, using the web page data 116, one or more dynamic web pages that in turn may be rendered by the web browser 120.

The web page data generator 112 includes a control module 124 generally configured to analyze the one or more expressions generated by the NL processing module 108 and map the one or more expressions to one or more of (i) one or more markup language elements, (ii) one or more scripting language statements, (iii) one or more stylesheet instructions, (iv) content to be added to the web page data 116, etc., in some embodiments. For example, the control module 124 may be configured to recognize NL commands as corresponding to particular tasks associated with web page design, and to construct, based on such recognition, one or both of (i) web page code (e.g., including one or more of (a) one or more markup language elements, (b) one or more scripting language statements, (c) one or more stylesheet instructions, (d) content to be added to the web page data 116, etc.) to be added to the web page data document 116, or (ii) web page code to replace existing web page code in the web page data document 116. For example, in some embodiments, the control module 124 may access a mapping 126 of NL commands to web page coding actions and/or data (e.g., web page content). In some embodiments, at least some of the mapping 126 is preconfigured. In some embodiments, the control module 124 is configured, additionally or alternatively, to adapt the mapping 126 over time and/or with respect to a particular web page or pages being developed. The mapping 126 may indicate web page coding actions such as one or more of adding specified content to a web page, specifying or changing a layout of the web page, specifying or changing parameters corresponding to behavior of the web page, etc., in various embodiments. The mapping 126 may be stored in a memory of the web page generation system 100, in some embodiments, and/or computed by parsing a specification, such as an HTML 4.01 doctype declaration http://www.w3.org/TR/html4/strict.dtd, or using another suitable method such as: http://www.w3.org/html/wg/drafts/html/master/syntax.html#overview-of-the-parsing-model.

In some embodiments, the mapping 126 indicates web page code (e.g., including one or more of (a) one or more markup language elements, (b) one or more scripting language statements, (c) one or more stylesheet instructions, (d) content to be added to the web page data 116, etc.) that correspond to different actions. For example, the mapping 126 may indicate that an action such as "Add Image," corresponds to an HTML element <img>. The mapping 126 may indicate multiple different code options for a particular action. For example, the mapping 126 may indicate that an action such as "Add Button" corresponds to an HTML element <button> as well as to an HTML element <input>. The mapping 126 may be stored in a memory of the web page generation system 100, in some embodiments.

In some embodiments, the control module 124 is configured to use the mapping 126 to analyze the one or more expressions generated by the NL processing module 108 and to map the one or more expressions to one or more of (i) one or more markup language elements, (ii) one or more scripting language statements, (iii) one or more stylesheet instructions, (iv) content to be added to the web page data 116, etc., in some embodiments.

In some embodiments, the control module 124 may be configured to determine parameters, attributes, variables, etc., that are to be included in the web page code. For example, the control module 124 may be configured to determine values of one or more parameters that are to be included in the web page code based on information in the NL input and/or the one or more expressions generated by the NL processing module 108. As another example, the control module 124 may be configured to make assumptions regarding values of one or more parameters that are to be included in the web page code. Additionally or alternatively, the control module 124 may be configured to prompt a user for information for determining values of one or more parameters that are to be included in the web page code. In some embodiments, the control module 124 may be configured to determine which parameters are mandatory versus which parameters are optional, and may generate web page code without determining values of some or all of the optional parameters.

The control module 124 is coupled to an editor 128. The editor 128 is configured to receive file editing commands from the control module 124 and, in response, modify the web page data document 116 accordingly. For example, the control module 124 may generate instructions that indicate a particular node to be added to the document 116, and a location in the document 116 at which the node should be added. Continuing with this example, the control module 124 may provide the instructions to the editor 128, and the editor 128 then implements the instructions, e.g., inserts the indicated node to the parsed document 116 at the specified location. Similarly, the control module 124 may generate instructions that indicate a particular node already in the document 116 and how the node should be modified. Continuing with this example, the control module 124 may provide the instructions to the editor 128, and the editor 128 then implements the instructions, e.g., parses the document and modifies the indicated node as specified.

The web page data generator 112 may include a context module 132, coupled to the control module 124. The context module 132 may be configured to determine context information and provide the context information to the control module 124. The control module 124 may then use the context information when analyzing the one or more expressions generated by the NL processing module 108, and/or when constructing web page code. For example, the context information may assist the control module 124 in determining how to interpret NL commands and/or how to map NL commands to web page coding actions. The context module 132 may analyze, over time, the expressions generated by the NL processing module 108 and/or interpretations of the expressions generated by the control module 124. As an illustrative example, if a user issued a first NL command "move button to right," and then a second NL command "move it a little more," the context module 132 may analyze such commands and make one or more assumptions such as "it" in the second NL command refers to the "button" in the first NL command, and "move . . . a little more" in the second NL command refers to directional instruction in the first NL command and thus "move . . . a little more" should be interpreted as "move . . . a little more to right," where "a little more" is interpreted in the context of the document 116 to mean a small percentage expressed in a relative unit of measurement such as an em (e.g., "move 1.2 ems"), or a more absolute unit of measurement such as a pixel (e.g., "move 10 pixels"). Similarly, an analysis of earlier instructions may help to interpret "button" in the first NL command. For example, if there are already multiple buttons in the web page being constructed, the context module 132 may interpret "button" in the first NL command as the most recently referred to button in earlier NL commands.

Similarly, in some embodiments, the context module 132 may be configured to analyze existing web page data 116, including parsing existing web page data 116, in some embodiments. For instance, continuing with the illustrative example above, the context module 132 may parse the web page data 116 and identify code in the web page data document 116 that corresponds to layout placement of the relevant button. The context module 132 may provide an indication of a location of the identified code to the control module 124. The context module 132 may also provide the identified code or values of relevant parameters in the identified code to the control module 124. The control module 124 may utilize the information provided by the context module 132 to appropriately instruct the editor module 128 to modify the identified code. For instance, continuing with the illustrative example above, the control module 124 may instruct the editor module 128 to appropriately modify existing code in the web page data document 116 that corresponds to placement of the relevant button.

In some embodiments, the context module 132 may be configured to apply learning techniques to adapt the mapping 126 based on usage by a particular user, a group of users, etc. For example, a particular user may utilize NL phrases to indicate code actions, where the NL phrases of the user are generally different than NL phrases used by a wider group of users. In some embodiments, the context module 132 may be configured with a default mapping of NL phrases to code actions (based on an analysis of a population of potential users, for example), and may apply learning techniques to adapt the mapping 126 to accommodate different NL phrases utilized by a particular user, a small group of users, a large population of users, etc.

In some embodiments, the context module 132 may be configured to analyze other documents, a file storage system, etc., with respect to content that may be added to, linked to, etc., the web page data document 116. For example, the web page generation system 100 may include, or be communicatively coupled to, one or more machine-readable storage devices that store documents, files, etc., organized according to a file storage system. Such documents, files, etc., may have content data that a user wants incorporated into a web page, and the context module 132 may be configured to analyze such files and/or storage system for the purpose of, for example, providing the content data, or links to files in which the content data is included, to the control module 124. The control module 124 may utilize the information provided by the context module 132 to appropriately instruct the editor module 128 parse the document 116 and to insert the content data, or links to the content data, in the web page data document 116. For instance, continuing with the illustrative example above, the control module 124 may instruct the editor module 128 to appropriately modify existing code in the web page data document 116 that corresponds to placement of the relevant button.

In some embodiments, the context module 132 may be configured to analyze user activity to determine context information. For example, the web page generation system 100 may include, or be communicatively coupled to, a user input device such as a mouse, a trackball, etc., and the context module 132 may be configured to analyze use of the user input device to generate context information. For example, the context module 132 may be configured to analyze a location of a mouse pointer (or the like) to determine where attention of the user is focused. This may be helpful, for example, in making an assumption regarding to which object an NL command is referring (e.g., "move it to the right"). Similarly, the web page generation system 100 may include, or be communicatively coupled to, one or more sensors configured to track eye movement, hand gestures, finger placement, etc., and the context module 132 may be configured to analyze use of the user input device to generate context information. For example, the context module 132 may be configured to analyze eye focus information, hand gesture information, finger placement information, etc. to determine where attention of the user is focused. This may be helpful, for example, in making an assumption regarding to which object an NL command is referring (e.g., "move it to the right").

In some embodiments, the control module 124 may be configured to determine assumptions concerning one or more of (i) ambiguities associated with the NL commands, (ii) information necessary for creating the web page not specified by the NL commands, etc. For instance, continuing with the illustrative example above, in the NL command "move it a little more," it is not clear what "it" refers to, it is not clear in which direction "it" is to be moved, and it is not clear how far is "further." Thus, the control module 124 may be configured to make assumptions regarding what "it" refers to, the direction "it" is to be move, and how far "it" is to be moved. In some embodiments, the control module 124 may be configured to make assumptions based on context information based on adjacent or similar elements in the web page document 116. In some embodiments, the control module 124 may be configured to make assumptions based on context information provided by the context module 132. In some embodiments, the control module 124 may be configured to make assumptions additionally or alternatively based on other information, such as a knowledge database (e.g., including information regarding web page design techniques), historical usage information, etc. In general, the control module 124 may be configured to make assumptions that correspond to the one or more of (i) content to be included in the web page, (ii) the layout for the web page, (iii) parameters corresponding to behavior of the web page, etc.

The system 100 may be utilized, in some embodiments, to modify an already created web page (e.g., created using another type of system such as a prior art web site builder or web editor). For example, the document 116 may correspond to an already created web page, and the context module 132 may be configured to analyze the document 116 and to provide context information. The system 100 may be configured, such as described above, to facilitate a user's modifications of the document 116 using NL commands.

In some embodiments, the system 100 may be implemented, at least in part, on a user computer such as a desktop computer, a laptop computer, a tablet computer, a mobile telephone, etc. For example, one or more components of the system 100 may be implemented using one or more processors executing software and/or firmware machine readable instructions. GUIs generated by the system 100 may be displayed on one or more display devices of the user computer. In some embodiments, the system 100 may be implemented, as a client/server system and/or using cloud computing techniques. For example, at least some components of the system 100 may be implemented on one or more server devices communicatively coupled to a user computer via a communications network such as a local area network (LAN), a metropolitan area network (MAN), a wide area network (WAN), a mobile communications network, the Internet, etc. For example, one or more components of the system 100 may be implemented using one or more processors of one or more servers, the one or more processors executing software and/or firmware machine readable instructions. Thus, in some embodiments, the user computer may include a network interface device configured to permit communication, via the communication network, with the one or more servers. Similarly, the one or more servers may each include a network interface device configured to permit communication, via the communication network, with the user computer and/or others of the one or more servers.

In some embodiments, the hypertext document 116 may be stored on a storage device (e.g., a disk drive, a FLASH device, a RAM, etc.) of, or communicatively coupled to, the user device. In some embodiments, the hypertext document 116 may be stored on a storage device (e.g., a disk drive, a FLASH device, a RAM, etc.) of, or communicatively coupled to, the one or more server devices, such as in a client-server and/or cloud computing implementation.

Figure 2:
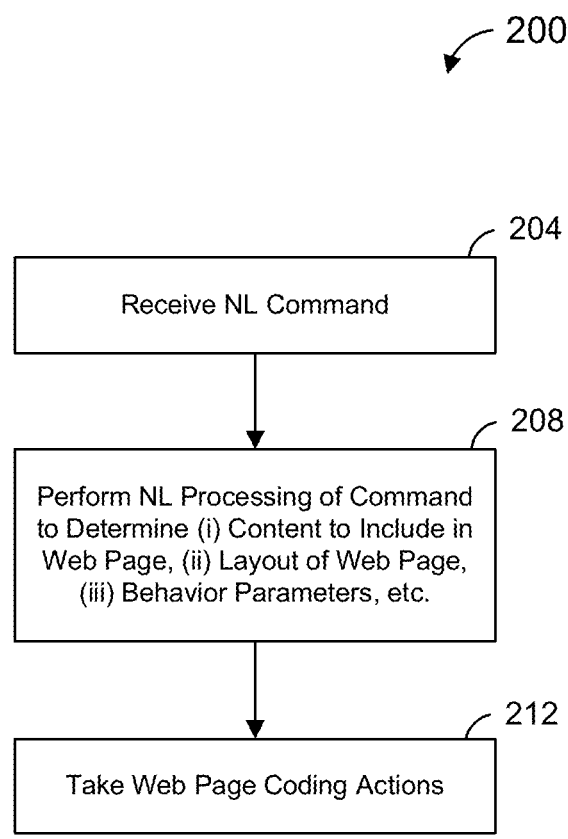
FIG. 2 is a flow diagram of an example method for creating and/or modifying a web page using NL commands from a user, according to an embodiment.

FIG. 2 is a flow diagram of an example method 200 for creating a web document, or modifying an existing web document, using natural language (NL) commands from a user, according to an embodiment. In an embodiment, the method 200 is implemented by the system 100 of FIG. 1, and the method 200 is discussed with reference to FIG. 1 for illustrative purposes. In other embodiments, however, the method 200 is implemented by another suitable system configured to perform NL processing of the NL commands to determine one or more of (i) content to be included in a web page, (ii) a layout for the web page, (iii) parameters corresponding to behavior of the web page, etc. In general, the method 200 may be implemented on a single computer, by a network of computers, in a client-server system, etc.

At block 204, an NL command is received. The NL command may describe, at least at a general level, one or more of (i) content of a web page, (ii) a layout of the web page, (iii) behavior of the web page, etc. Referring to FIG. 1, the block 204 may be implemented by the input module 104, for example.

In some embodiments, the NL command may have been entered by a user as text using, for example, a keyboard, a touch screen, etc. In some embodiments, the NL command may have been entered by a user using speech recognition techniques.

At block 208, NL processing of the NL command is performed to determine one or more of (i) content to be included in the web page, (ii) a layout for the web page, (iii) parameters corresponding to behavior of the web page, etc. Block 208 may be performed by the NL processing module 108 and the control module 124, in some embodiments, and block 208 may include processing such as described above with respect to the NL processing module 108 and the control module 124, in some embodiments.

For example, in some embodiments, the NL processing includes determining one or more assumptions concerning one or more of (i) ambiguities associated with the NL command, (ii) information not specified by the NL command but necessary for performing a web page coding action, etc. In some embodiments, the assumptions correspond to the one or more of (i) content to be included in the web page, (ii) a layout for the web page, (iii) parameters corresponding to behavior of the web page, etc.

At block 212, one or more web page coding actions are taken based on the NL processing of block 208. The one or more web page coding actions may include writing to the document 116 one or more of (i) one or more markup language elements, (ii) one or more scripting language statements, (iii) content or links to content, etc. Block 212 may include determining the one or more of (i) one or more markup language elements, (ii) one or more scripting language statements, (iii) content or links to content, etc., based on the NL processing of block 208. For example, a web page coding action determined at block 208 may be mapped to markup language elements, scripting language statements, etc.

Figure 3B:
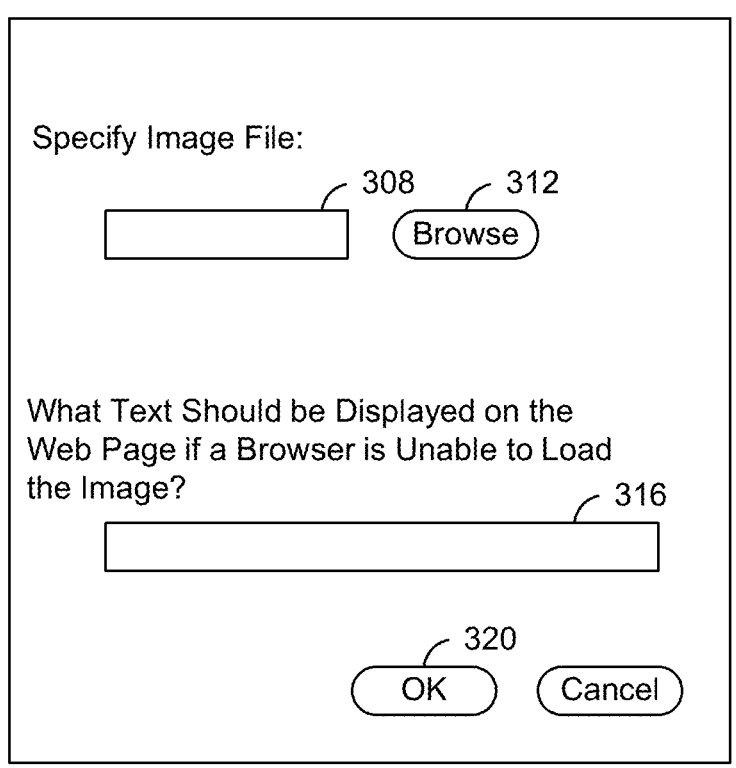

FIGS. 3A-3F are illustrative depictions of an example in which a web document 300 is created using the system 100, or another suitable system, according to an embodiment. FIGS. 3A and 3C-3F depict the web document 300 at different stages, as is described in more detail below. FIG. 3B is an illustration of an example graphical user interface that may be utilized by the system 100 to prompt the user for information, as is described in more detail below. The web document 300 may be rendered by the web browser 120 so that the user can visualize the web page during the different stages and to facilitate adjusting the layout, in some embodiments.

FIG. 3A depicts the web document 300 at an initial stage. At the initial stage, the user issues an NL command such as "add picture from my computer to upper right corner," "insert picture in upper right corner," "put a picture in the upper right corner," etc. The system 100 (e.g., the NL processing module 108 and/or the control module 124) analyzes the NL command and determines, based on the analysis of the NL command, that the user wants to insert an image into the web document 300. The control module 124 selects an <img> HTML element from a list of HTML elements known to the system 100 using the mapping 126, and determines that an <img> tag has two required attributes: 1) src and 2) alt which define, respectively, a Uniform Resource Identifier of an associated image file and an alternative text to display if the image file cannot be loaded. The control module 124 further determines that <img> tags have several optional attributes.

In an embodiment, the control module 124 may determine values of at least the required attributes, i.e., src and alt, of the <img> tag. For example, the control module 124 may determine that parameter values for src and alt cannot be determined from information in the NL input and/or the one or more expressions generated by the NL processing module 108. The control module 124 may also determine that parameter values for src and alt cannot be assumed. Thus, in one embodiment, the control module 124 may prompt the user to provide values for at least the attributes src and alt.

FIG. 3B illustrates an example graphical user interface (GUI) display 304 that the control module 124 may be utilize to prompt the user to provide values for at least the attributes src and alt. For example, the GUI display 304 includes text that prompts a user to provide (i) information indicating an image file that is to be added to the web page (i.e., a parameter value for src), and (ii) text that should be displayed in the event a browser cannot load the image (i.e., a parameter value for alt). The GUI display 304 includes a box 308 in which a user can indicate an image file. For example, in an embodiment, a user can type in a uniform resource identifier (URI) corresponding to an image file. The GUI display 304 also includes a button 312 that a user can use to browse a file system of a computer, for example, to select an image file. The GUI display 304 also includes a text box 316 in which a user can type text corresponding to the text that should be displayed in the event a browser cannot load the image (i.e., a parameter value for alt). The GUI display 304 further includes a button 320 that the user can select after providing and/or indicating the src and alt parameter values.

In some embodiments, the GUI display 304 or another suitable display prompts the user, in a suitable manner, for providing parameter values for optional attributes of the <img> tag.

Next, the control module 124 generates, using the determined parameter values semantically-valid HTML text such as:

<img id=1 src="/path/to/my/image.jpeg" alt="cellular automata"/>

In an embodiment, the control module 124 assigns a unique identifier (e.g., id) to the generated HTML text. More generally, the control module 124 may assign a respective unique identifier to each node or element in the web page. This may allow the control module 124 to later identify particular nodes or elements in the document 116 when, for example, the control module 124 needs to modify an existing node/element. Additionally, this may allow the control module 124 to refer to the node when generating CSS rules.

Having generated semantically-valid HTML text, the control module 124 parses the generated HTML into a node and queues the node for insertion at an as-yet unspecified location in the document object 116.

Continuing with the interpretation of the user's input command, the parser 108 and/or the control module 124 determines that the NL phrase "to upper right corner" generally corresponds to placement of the image within the web page. Additionally, the control module 124 may make assumptions about an exact placement of the image. Thus, the control module 124, using (i) the NL phrase and/or one or more expressions generated by the NL processing module 108, (ii) the mapping 126, and (iii) its assumptions, determines that an appropriate CSS rule for placement of the image should include a declaration/value "float:right". Additionally, the control module 124 determines that the CSS rule is associated with the generated HTML text corresponding to img and id=1, and therefore determines that the CSS rule should have a selector of "img#1". Thus, the control module 124 generates a semantically-valid CSS rule such as:

img#1{float: right;}

Having generated the semantically-valid HTML text and the associated, semantically-valid CSS rule, the control module 124 determines a location in the document 116 at which to insert HTML text and CSS rule, and instructs the editor module 128 to insert the HTML text and CSS rule at the specified location.

Figure 3C:
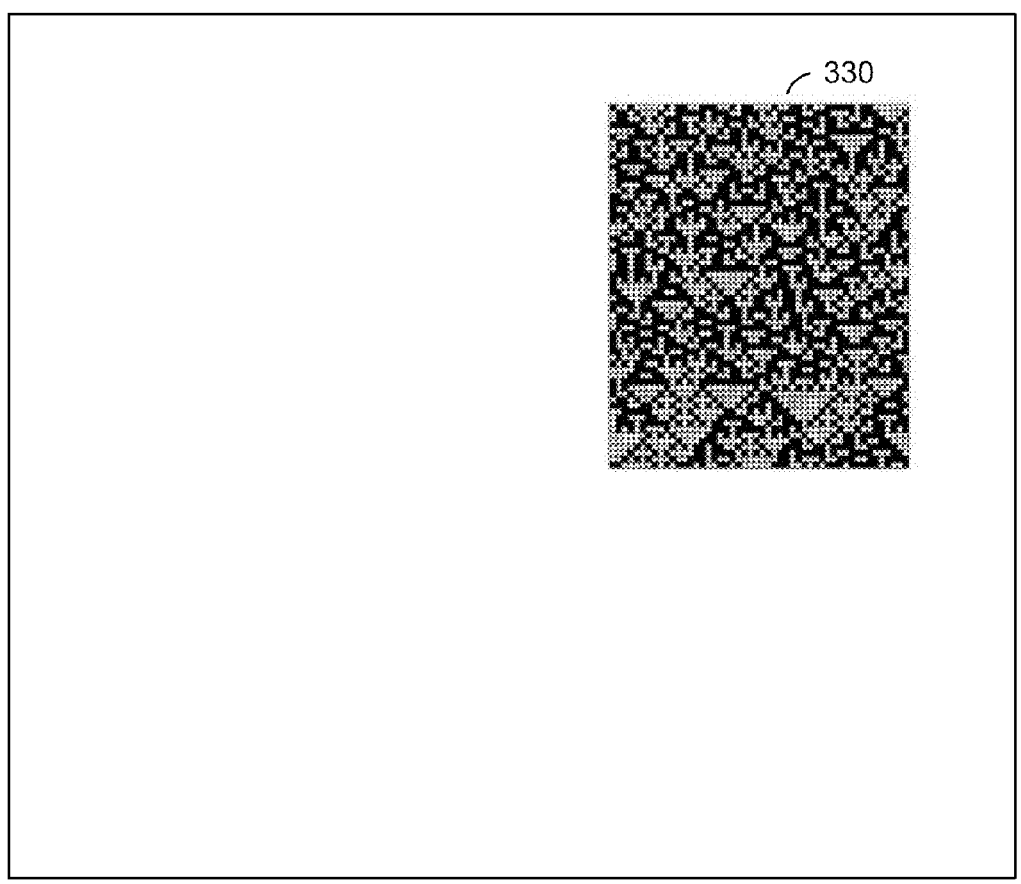

FIG. 3C depicts the web document 300 after a picture 330 has been added to the web document 300. At this stage, the user issues another NL command "add button," "insert button," "I need a button," etc. The system 100 analyzes the NL command and determines, based on the analysis of the NL command, that web page code for adding a button to the web document 300 will be needed. Additionally, the control module 124 determines, using the mapping 126, that there are two alternative HTML elements that can be utilized: <button> and <input> and that may correspond to the NL command. In some embodiments, the control module 124 may make an assumption that one of the alternatives is to be used. Additionally, the control module 124 may prompt the user for more information to facilitate selecting one of the alternatives. For example, the control module 124 may prompt the user for more information about how the button will be used. In some embodiments, the control module 124 may prompt the user to select either <button> or <input>.

Further, the system 100 may make one or more other initial assumptions, in some embodiments. For example, the NL command does not specify a shape or size of the button. Thus, the system 100 may make initial assumptions regarding the shape and size of the button. Similarly, the NL command does not specify a location of the button. Thus, the system 100 may make initial assumptions regarding where the button will be located. Additionally, the NL command does not specify whether the button should include text and, if so, what text should be included. Thus, the system 100 may make initial assumptions regarding text included in the button.

In some embodiments, the control module 124 may utilize a GUI display similar to GUI display 304 to prompt the user to provide values of required (and optional, in some embodiments and/or scenarios) attributes of a selected HTML element (e.g., <button> or <input>).

In a manner similar to the technique discussed above with respect to FIGS. 3A and 3C, the control module 124 may generate a button node (e.g., semantically-valid HTML text) and a semantically-valid CSS rule for placement of the button node. For example, the button node is assigned a unique identifier. Having generated the semantically-valid HTML text and the associated, semantically-valid CSS rule, the control module 124 determines a location in the document 116 at which to insert HTML text and CSS rule, and instructs the editor module 128 to insert the HTML text and CSS rule at the specified location.

Figure 3D:
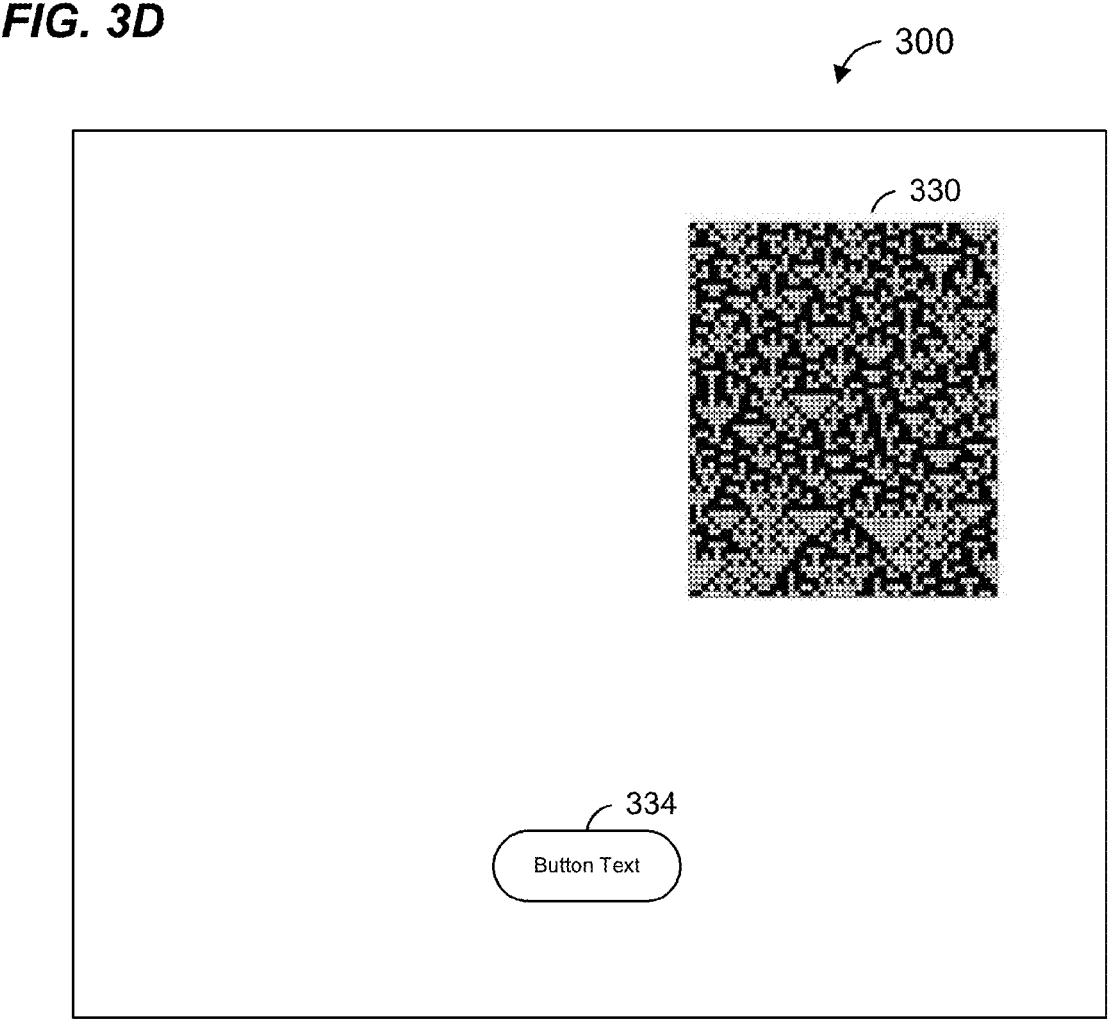

FIG. 3D depicts the web document 300 after a button 334 has been added to the web document 300. As discussed above, the system 100 made several assumptions regarding the button 334, such as the shape, the size, and the location of the button, as well as the text included in the button. At this stage, the user issues an NL command "move it right," "move right," "more to the right," etc. The system 100 analyzes the NL command and may make an assumption that the NL command (e.g., "it") is referring to the most recently modified element of the web document 300: the button 334. Thus, based on this assumption, the system 100 determines, based on the analysis of the NL command, that the web page code corresponding to the location of the button 334 will need to be modified. In some embodiments, the system 100 may make the assumption that the NL command is referring to the button 334 using one or more alternative or additional techniques such as identifying a web page element (e.g., the button 334) on which the user is focused using sensors that track eye movement, tracking placement of a cursor, etc.

Additionally, the system 100 makes an assumption regarding a new location for the button 334. For example, the NL command does not specify an exact new location for the button 334, merely that it should be moved to the right. Thus, the system 100 makes an assumption that the button 334 should be moved half way between its current location and a right edge of the web document 300. The system 100 may generate appropriate CSS code to change the location of the button 334, and appropriately modifies the document 116. For example, the control module 124 may use the unique identifier assigned to the button 334 to identify the CSS rule in the document 116 that corresponds to the button 334, and the control module 124 may instruct the editor 128 to appropriately modify the CSS rule, replace the CSS rule with a new CSS rule, etc.

Figure 3E:
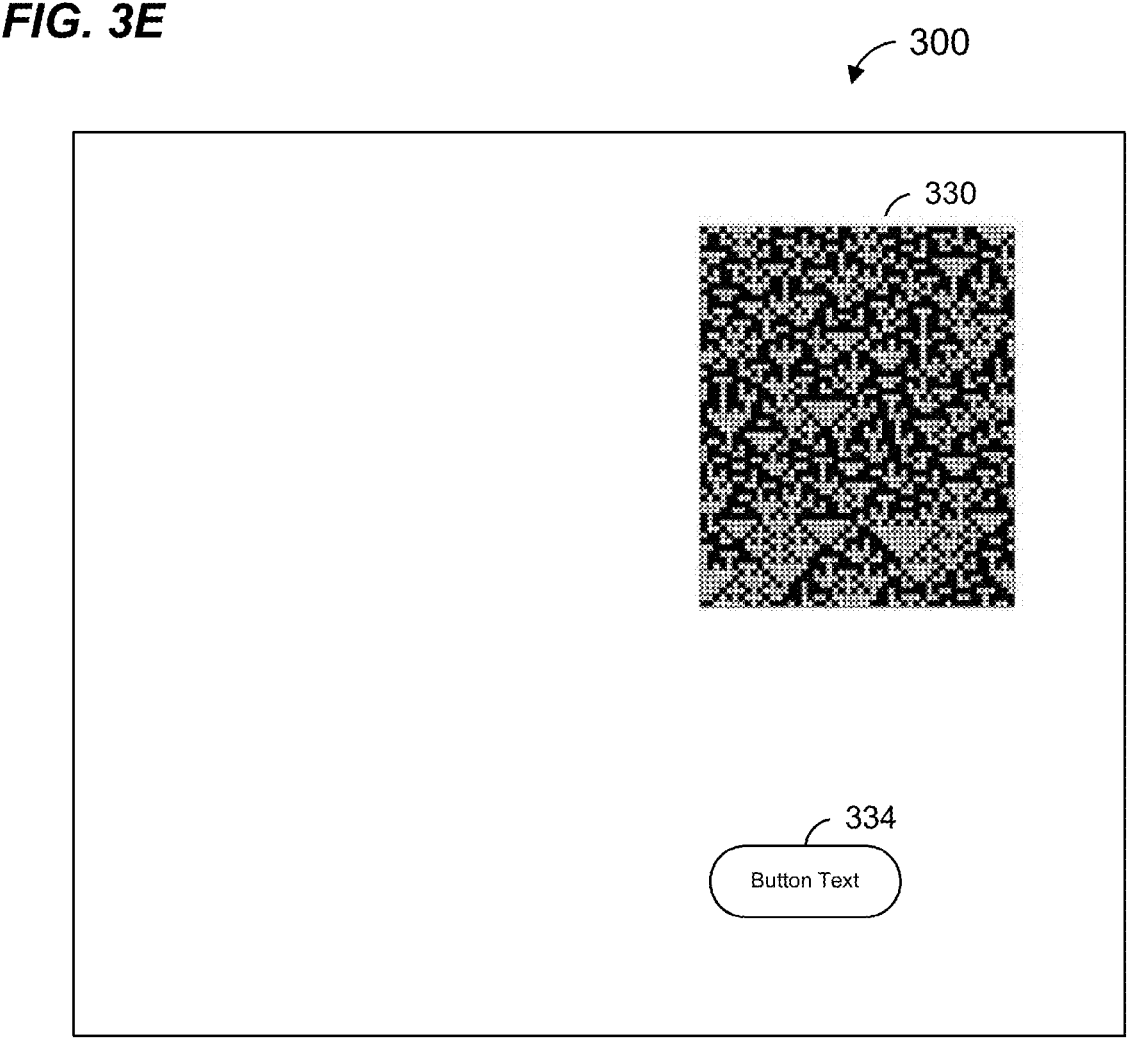

FIG. 3E depicts the web document 300 after the button 334 has been moved. At this stage, the user issues an NL command "make corners square," "square corners," etc. The system 100 analyzes the NL command and makes an assumption that the NL command is referring to the most recently modified element of the web document 300: the button 334. Thus, based on this assumption, the system 100 determines, based on the analysis of the NL command, that the web page code corresponding to the shape of the button 334 will need to be modified. In some embodiments, the system 100 may make the assumption that the command "make corners square" refers to the button 334 using one or more alternative or additional techniques such as identifying a web page element (e.g., the button 334) on which the user is focused using sensors that track eye movement, tracking placement of a cursor, etc.

The system 100 may generate appropriate HTML code to change the shape of the button 334, and appropriately modifies the document 116. For example, the control module 124 may use the unique identifier assigned to the button 334 to identify the HTML text in the document 116 that corresponds to the button 334, and the control module 124 may instruct the editor 128 to appropriately modify the HTML text, replace the HTML text with new HTML text, etc.

Figure 3F:
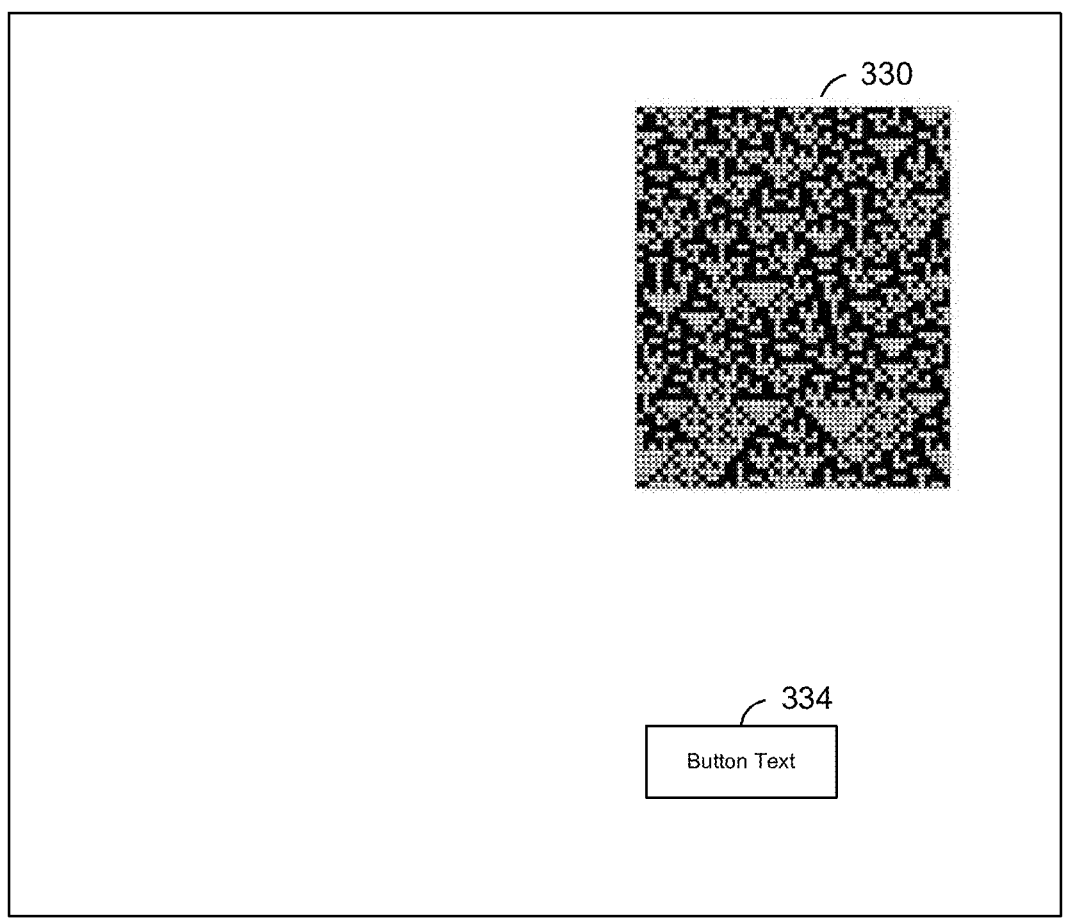

FIG. 3F depicts the web document 300 after the shape of the button 334 has been change to have square corners.

As illustrated by the examples discussed with respect to FIGS. 3A-3F, the user need not enter commands in a precise syntax. Additionally, the commands need not specify all parameters needed to generate the web document code because the system 100 is capable of making assumptions regarding missing or ambiguous information. Thus, the creation of web documents is simplified for novices, yet flexibility such as provided by web editors is maintained.

Figures 4A, 4B:
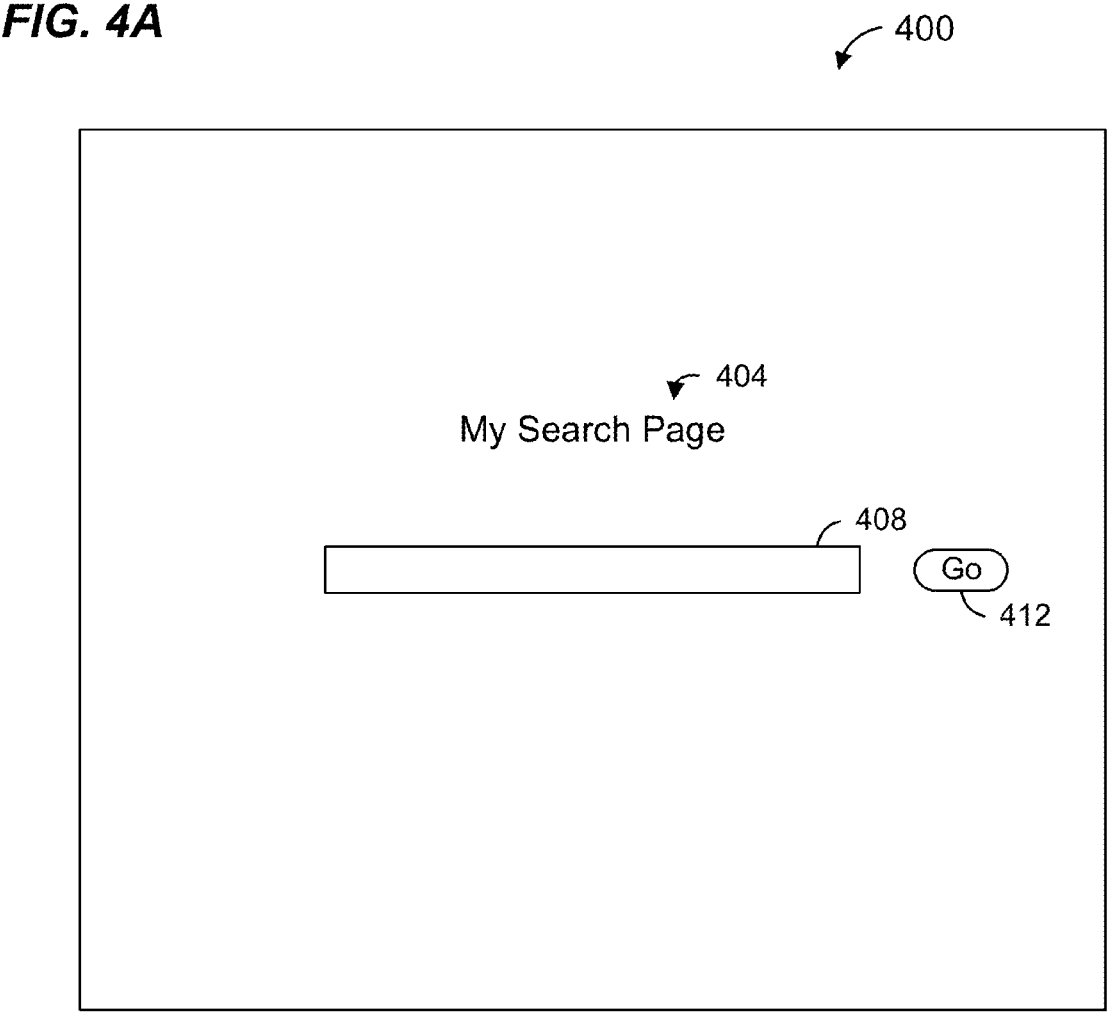
FIG. 4A is a diagram of a rendering of an example web page that may have been developed by the system of FIG. 1 or another system such as a WYSIWYG website builder or web editor.
FIG. 4B illustrates code that may correspond to the web page rendering of FIG. 4A.

In some embodiments, the system 100 is configured to assist a user in modifying an already existing web page document. For example, the already existing web page document may have been created by the system 100 or another system, such as a WYSIWYG website builder or web editor. FIG. 4A is a diagram of an example rendering of a web page 400 that may have been developed by the system 100 or another system such as a WYSIWYG website builder or web editor. The web page 400 includes a heading 404, a text box 408, and a button 412.

FIG. 4B is HTML code 420 that may be included in a web document that corresponds to the web page 400 of FIG. 4A. The code 420 includes i) a doctype declaration, ii) code 424 that corresponds to the heading 404, iii) code 428 that corresponds to the text box 408, and iv) code 432 that corresponds to the button 412. Illustrative examples of using the system 100 for modifying an already existing web page document are described below with reference to FIGS. 4A and 4B.

In one illustrative example, discussed with references to FIGS. 5A, 5B, and 5C, a user may enter an NL input such as "focus the first input on load," "make first input be in input box," "focus first input on text box," etc. The system 100 interprets the NL input and determines that the user wishes that the default focus of the web page 400, upon loading, should be the text box 408. The control module 124 may determine that there is a plurality of ways to provide the requested functionality to the web page 400. For example, in an embodiment, the control module 124 may determine that jQuery JavaScript code can be utilized to provide the desired functionality. FIG. 5A is an example of jQuery JavaScript code 500 that the control module 124 may determine is suitable for providing the desired functionality. The control module 124 may use the mapping 126 to generate the jQuery JavaScript code 500 using the selected template. Thus, in some embodiments, the control module 124 may use the mapping 126 to translate an NL command to jQuery JavaScript code.

As another example, the control module 124 may determine that vanilla JavaScript code can be utilized to provide the desired functionality. FIG. 5B is an example of vanilla JavaScript code 504 that the control module 124 may determine is suitable for providing the desired functionality. The control module 124 may use the mapping 126 to generate the vanilla JavaScript code 504 using the selected template. Thus, in some embodiments, the control module 124 may use the mapping 126 to translate an NL command to vanilla JavaScript code.

As yet another example, the control module 124 may determine that the existing HTML code 420 (FIG. 4B) can be modified to provide the desired functionality. FIG. 5C is an example of a modification of the HTML code 420 that the control module 124 may determine is suitable for providing the desired functionality. In particular, the code 428 has been modified to insert the element "autofocus" 508.

In an embodiment, when the control module 124 determines that there are a plurality of ways to provide requested functionality, the control module 124 may attempt to make an assumption regarding which way should be utilized. For example, the control module 124 may be configured to rank the efficiency of the ways (e.g., in terms of code size, speed, etc., or some other suitable metric or metrics), determine which ways support the largest number of browsers in current use, etc. The control module 124 may then choose one of the ways, based on the efficiency ranking, the numbers of supported browsers, etc. In some embodiments, the user may be informed of i) the different ways, and ii) the chosen assumption, and be given an opportunity to change the selection.

The control module 124 then instructs the editor 128 to add code (e.g., code 500 or code 504) to the web document or modify existing code in the web document (e.g., modify HTML code 428) to provide the requested functionality.

In some embodiments, the control module 124 may be configured to prompt the user to select which one of the plurality of ways of providing the requested functionality should be utilized. For example, the control module 124 may generate a GUI to inform the user of the different ways and prompt the user to select one of the ways. In some embodiments, the control module 124 may be configured to prompt the user to provide more information to assist the control module 124 in making a selection. For example, the control module 124 may generate a GUI to prompt the user for more information such as a ranking of importance, by the user, of factors such as code size, number of browsers supported, etc. In some embodiments, the control module 124 may be configured to eliminate some of the ways that may be utilized, based on the efficiency ranking, the numbers of supported browsers, etc. Then, the control module 124 may be configured to prompt the user to select which one of the reduced number of ways should be utilized.

In another illustrative example, discussed with references to FIGS. 6A, 6B, and 6C, a user may enter an NL input such as "make background blue." The system 100 interprets the NL input and determines that the user wishes that the background color of the web page 400 should be blue. The control module 124 may determine that there is a plurality of ways to provide the requested functionality to the web page 400. For example, in an embodiment, the control module 124 may determine that jQuery JavaScript code can be utilized to provide the desired functionality. FIG. 6A is an example of jQuery JavaScript code 600 that the control module 124 may determine is suitable for providing the desired functionality. The control module 124 may select a jQuery JavaScript template from a list of jQuery JavaScript templates known to the system 100 using the mapping 126, and generates the jQuery JavaScript code 600 using the selected template.

As another example, the control module 124 may determine that vanilla JavaScript code can be utilized to provide the desired functionality. FIG. 6B is an example of vanilla JavaScript code 604 that the control module 124 may determine is suitable for providing the desired functionality. The control module 124 may select a vanilla JavaScript template from a list of vanilla JavaScript templates known to the system 100 using the mapping 126, and generates the vanilla JavaScript code 604 using the selected template.

As yet another example, the control module 124 may determine that HTML code can be utilized to provide the desired functionality. FIG. 6C is an example of HTML code 608 that the control module 124 may determine is suitable for providing the desired functionality. The control module 124 may selects a <body style> HTML element from a list of HTML elements known to the system 100 using the mapping 126, and determines that a <bodystyle> tag will need a color attribute to set the background color. The control module 124 may determine that the color attribute can be determined from information in the NL input, and thus control module 124 may utilize the term "blue" in the NL input as the required parameter.

In an embodiment, when the control module 124 determines that there are a plurality of ways to provide requested functionality, the control module 124 may attempt to make an assumption regarding which way should be utilized. For example, the control module 124 may be configured to rank the efficiency of the ways (e.g., in terms of code size, speed, etc., or some other suitable metric or metrics), determine which ways support the largest number of browsers in current use, etc. The control module 124 may then choose one of the ways, based on the efficiency ranking, the numbers of supported browsers, etc. In some embodiments, the user may be informed of i) the different ways, and ii) the chosen assumption, and be given an opportunity to change the selection.

The control module 124 then instructs the editor 128 to add code (e.g., code 600, code 604, or code 608) to the web document to provide the requested functionality.

In some embodiments, the control module 124 may be configured to prompt the user to select which one of the plurality of ways of providing the requested functionality should be utilized. For example, the control module 124 may generate a GUI to inform the user of the different ways and prompt the user to select one of the ways. In some embodiments, the control module 124 may be configured to prompt the user to provide more information to assist the control module 124 in making a selection. For example, the control module 124 may generate a GUI to prompt the user for more information such as a ranking of importance, by the user, of factors such as code size, number of browsers supported, etc. In some embodiments, the control module 124 may be configured to eliminate some of the ways that may be utilized, based on the efficiency ranking, the numbers of supported browsers, etc. Then, the control module 124 may be configured to prompt the user to select which one of the reduced number of ways should be utilized.

In another illustrative example, a user may enter an NL input such as "change doctype to html 5," "make it html 5," "make it an html 5 page," etc. The system 100 interprets the NL input and determines that the user wishes that a document type of the web document 420 should be set to "HTML5." The control module 124 may use the mapping 126 to determine that a doctype declaration is needed. The system 100 may analyze the code 420 to determine that the declaration 422 in the web document 420 corresponds to a doctype declaration, and may determine that the declaration 422 may be modified in order to set the document type of the web document 420 to "HTML5." For example, the control module 124 may determine that the declaration 422 should be modified to:

<!DOCTYPE HTML>.

The control module 124 then instructs the editor 128 to modify the declaration 422 to set the document type of the web document 420 to "HTML5."

In another illustrative example, a user may enter an NL input such as "change header to 'My Cool Search Page'", "change wording of header to 'My Cool Search Page'", "modify header to read 'My Cool Search Page'", etc. The system 100 interprets the NL input and determines that the user wants to change the wording of an existing heading. The system 100 may analyze the code 420 to determine which heading in the code 420 is to be changed. If there are multiple headings, the system 100 may make an assumption regarding which heading is to be changed and/or may prompt the user (with a GUI, for example) to provide more information to assist the system 100 in selecting one of the headers, using techniques such as described above.

The control module 124 may determine that the declaration 424 should be modified to:

<h1> My Cool Search Page </h1>.

The control module 124 then instructs the editor 128 to modify the declaration 424 appropriately.

In another illustrative example, a user may enter an NL input such as "make the font bigger", "make font bigger", "bigger font", etc. The system 100 interprets the NL input and determines that the user wants to change the font size of text of one or more existing elements of the web document 400. The system 100 may analyze the code 420 to determine which element or elements are to be changed. If there are multiple existing elements with text, the system 100 may make an assumption regarding which element is to be changed and/or may prompt the user (with a GUI, for example) to provide more information to assist the system 100 in selecting one or more of the elements, using techniques such as described above.

For example, in one embodiment, the control module 124 may make the assumption that the user wants to change the text of the element most recently created or modified. For example, the control module 124 may assume that the heading 404 is to be modified. The control module 124 may generate, using the mapping 126, the following CSS code:

```
var fontsze=$("h1").css('font-size');
$("h1").css('font-size', fontsze*1.15);
```

The control module 124 then instructs the editor 128 to add the appropriate code to the web document 420, and may instruct the editor 128 to re-load or re-evaluate the document, if such a reloading is necessary to execute the newly-inserted code.

In another illustrative example, a user may enter an NL input such as "post input box value to URL when button pressed", "post input box to URL when button activated", "post input box contents to URL when button selected", etc. The system 100 interprets the NL input and determines that the user wants a value received via an input box to be posted to a URL when a button is pressed. The system 100 may analyze the code 420 in an attempt to determine the input box to which the user is referring. If there are multiple existing input boxes, the system 100 may make an assumption regarding to which one of the input boxes is the user referring, using techniques such as described above. Similarly, if there are multiple existing buttons, the system 100 may make an assumption regarding to which one of the buttons is the user referring, using techniques such as described above. In an embodiment, because there is only one input box 408 and one button 412, the system 100 may assume that the user is referring to the input box 408 and the button 412. The system 100 may determine that the desired functionality is: when a user selects the button 412, a value in the input box 408 should be posted to a URL.

The control module 124 may prompt the user to specify a URL to which to post. For example, the control module 124 may generate a GUI and cause the GUI to be displayed.

Figures 7, 8:
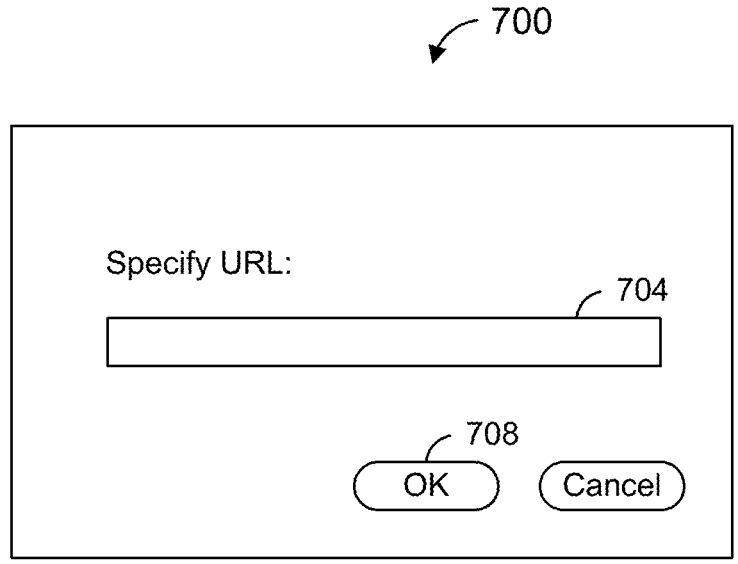
FIG. 7 is a diagram of an example GUI that may be generated by the system of FIG. 1 to prompt a user to provide additional information associated with an NL command, according to an embodiment.
FIG. 8 is an example of web document code that may be generated by the system of FIG. 1 in response to an NL command, according to an embodiment.

FIG. 7 illustrates an example GUI display 700 that the control module 124 may utilize to prompt the user to provide the URL. For example, the GUI display 700 includes text that prompts a user to provide the URL. The GUI display 700 includes a box 704 in which a user can indicate the URL, e.g., type text corresponding to the URL. The GUI display 700 also includes a button 708 that the user can select after providing and/or indicating the URL in the box 704. In FIG. 7, the user entered the text "http://example-.com/exampleurl."

After the user indicates the URL, the control module 124 may generate code 800 (FIG. 8) for providing the requested functionality. For example, the control module 124 may determine, using the mapping 126, a template for posting something to a URL based on an input event. Additionally, the control module 124 may generate, using the template, the code 800. Further, the control module 124 may determine that the code 800 should be added to the web document 420. The control module 124 then instructs the editor 128 to add the code 800 to the web document 420.

In yet another illustrative example, a user may enter an NL input such as "add a table with 8 rows and 3 columns", "insert table having 8 rows and 3 columns", "insert table with 3 columns and eight rows", etc. The system 100 interprets the NL input and determines that the user wants to add a table to the document 400. The system 100 may make one or more assumptions and/or prompt the user for additional information using techniques such as described above. For example, the NL input does not specify a location on the rendered document 400 for the table, so the system 100 may make an assumption regarding location (e.g., after last already existing element on the rendered document 400) or prompt the user to specify a location. Similarly, the NL input does not specify content for the table, so the system 100 may make an assumption that the table is to be empty or prompt the user for more information. Also, the NL input does not specify how borders/lines in the table are to be displayed, so the system 100 may make an assumption that no borders/lines in the table are to be shown or prompt the user for more information.

The control module 124 may generate code 900 (FIG. 9) corresponding to a table with eight rows and three columns. For example, the control module 124 may determine, using the mapping 126, HTML elements corresponding to a table. Additionally, the control module 124 may generate, using the template, the code 900. Further, the control module 124 may determine that the code 900 should be added to the web document 420. The control module 124 then instructs the editor 128 to add the code 900 to the web document 420.

In still another illustrative example, a user may enter an NL input such as "add a lorem ipsum paragraph", "insert lorem ipsum text", etc. The system 100 interprets the NL input and determines that the user wants to add a paragraph with a Lorem Ipsum passage. The system 100 may make one or more assumptions and/or prompt the user for additional information using techniques such as described above. For example, the NL input does not specify a location on the rendered document 400 for the paragraph, so the system 100 may make an assumption regarding location (e.g., after last already existing element on the rendered document 400) or prompt the user to specify a location.

The control module 124 may generate code 1000 (FIG. 10) corresponding to a paragraph with a Lorem Ipsum passage. For example, the control module 124 may determine, using the mapping 126, a template for a paragraph of text. Additionally, the control module 124 may generate, using the template, the code 1000. Further, the control module 124 may determine that the code 1000 should be added to the web document 420. The control module 124 then instructs the editor 128 to add the code 1000 to the web document 420.

In some embodiments, the system 100 may be configured to utilize different web document themes that specify color schemes, fonts, etc., and NL commands or phrases may be mapped to different themes. For example, an NL command such as "make it simpler" may be mapped to a theme with a grayscale color scheme, sans-serif fonts, etc. Thus, in response to an NL command such as "make it simpler", the control module 124 may modify the web document to utilize the grayscale color scheme, sans-serif fonts, etc., in an embodiment. As another example, an NL command such as "jazz it up" may be mapped to a theme with a bold color scheme, drop shadow fonts, stylized buttons, etc. Thus, in response to an NL command such as "jazz it up", the control module 124 may modify the web document to utilize the bold color scheme, drop shadow fonts, stylized buttons, etc., in an embodiment.

In some embodiments, the system 100 may be configured to interface with an external information source to permit the system 100 to obtain information for use in generating web documents. For example, in one embodiment, the system 100 may be configured to communicatively couple to the WOLFRAM|ALPHA® system provided by Wolfram Alpha LLC. For example, the system 100 may be configured to interface with the WOLFRAM|ALPHA® system using an application programming interface (API). Thus, in another illustrative example, a user may enter an NL input such as "add a picture of George Washington". The system 100 interprets the NL input and determines that the user wants to add a picture to the web document 400. The system 100 may also determine that the phrase "George Washington" may indicate the content of the picture. In an embodiment, the system 100 queries, using the API, the WOLFRAM|AL-PHA® system with a query such as "picture of George Washington". In response, the WOLFRAM|ALPHA® system responds to the query with an answer, which may include an image of George Washington (e.g., a GIF image object). The system 100 may parse the answer from the WOLFRAM|ALPHA® system for an image object, and then add the image to the web document 420.

The system 100 may make one or more assumptions and/or prompt the user for additional information using techniques such as described above. For example, the NL input does not specify a location on the rendered document 400 for the image, so the system 100 may make an assumption regarding location (e.g., after last already existing element on the rendered document 400) or prompt the user to specify a location. Similarly, if the answer from the WOLFRAM|ALPHA® system includes multiple image objects, the system may make an assumption regarding which image object (e.g., the first image object in the answer) or prompt the user to specify which image object should be utilized.

More generally, the system 100 may be configured to utilize the external information source to assist with NL interpretation of NL inputs to the system 100. For example, in some embodiments, the system 100 may be configured to communicatively couple to the WOLFRAM|ALPHA® system and to utilize WOLFRAM|ALPHA® system to assist with NL interpretation of NL inputs to the system 100. For example, in some embodiments, the system 100 may be configured to send to the WOLFRAM|ALPHA® system as a query words or phrases that the system 100 is not able to interpret. The system 100 may utilize answers from the WOLFRAM|ALPHA® system to help interpret the query in which the words or phrases were included.

Figure 11:
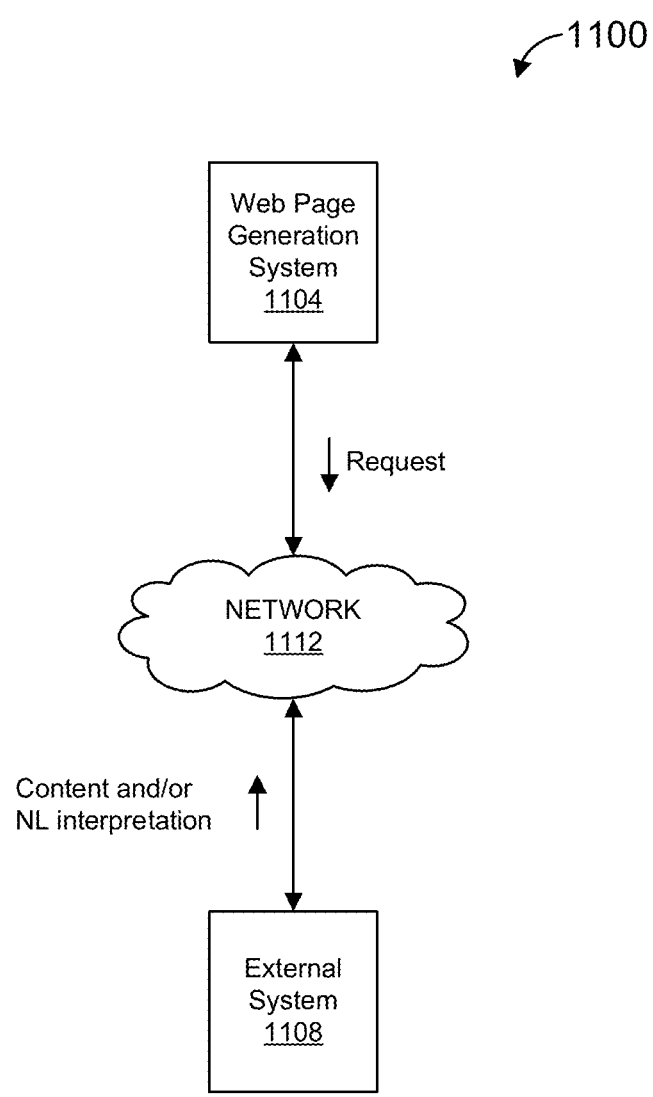
FIG. 11 is a block diagram of an example system in which a web page generation system, such as the system 100 of FIG. 1, utilizes an external system for obtaining content and/or information regarding interpretation of an NL input, according to an embodiment.

FIG. 11 is a block diagram of an example system 1100 in which a web page generation system 1104, such as the system 100 of FIG. 1, utilizes an external system 1108 for obtaining content and/or information regarding interpretation of an NL input, according to an embodiment. The web page generation system 1104 is communicatively coupled to the external system 1108 via a communication network 1112.

In some embodiments, the external system 1108 is configured to provide content in response to requests from the web page generation system 1104. Thus, in an example, a user may enter an NL input such as "add a picture of George Washington". The system 1104 interprets the NL input and determines that the user wants to add a picture to a web document. The system 1104 may also determine that the phrase "George Washington" may indicate the content of the picture. In an embodiment, the system 1104 generates a request for a picture of George Washington and sends the request to the external system 1108 via the network 1112. In response, the external system 1108 responds to the request with the requested content (e.g., a GIF image object). The system 1104 may parse the response from the external system 1108 for an image object, and then add the image to the web document.

In some embodiments, the external system 1108 is configured, additionally or alternatively, with NL processing functionality and to provide results of NL processing of an NL input in response to a request. For example, in some embodiments, the system 1100 may be configured to send to the external system 1108 words or phrases that the system 1104 is not able to interpret. For example, in an embodiment, the system 1104 generates a request for NL processing of certain words or phrases and sends the request to the external system 1108 via the network 1112. In response, the external system 1108 responds to the request with a result of NL processing of the words or phrases. For example, the result may indicate an interpretation represented in a precise syntax that the system 1104 is configured to understand. The system 1104 may then utilize the interpretation to generate web page code and/or modify existing web page code.

In some embodiments, the system 1104 may be configured to interface with the external system 1108 using a suitable API associated with the external system 1108.

In one embodiment, the external system 1108 comprises the WOLFRAM|ALPHA® system.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an ASIC, a programmable logic device, etc. When implemented utilizing a processor executing software or firmware instructions, the software or firmware instructions may be stored in any tangible, non-transitory computer readable medium or media such as a magnetic disk, an optical disk, a tape drive, a RAM, a ROM, a flash memory, a memory of a processor, etc. Likewise, the software or firmware instructions may be delivered to a user or a system via any known or desired delivery method including, for example, on a tangible, non-transitory computer readable medium or media, or via communication media. The software or firmware instructions may include machine readable instructions that, when executed by the processor, cause the processor to perform various acts.

Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of creating or modifying a hypertext document, comprising:
   (A) receiving, at one or more computer processors, natural language (NL) commands describing one or more of (i) content of the hypertext document, (ii) a layout of the hypertext document, or (iii) behavior of the hypertext document;
   (B) performing, at one or more computer processors, NL processing of the NL commands to determine one or more of (i) content to be included in the hypertext document, (ii) a layout for the hypertext document, or (iii) parameters corresponding to behavior of the hypertext document, wherein performing the NL processing includes:
   determining, at one or more computer processors, assumptions concerning (a) ambiguities associated with the NL commands and (b) information necessary for creating the hypertext document not specified by the NL commands, wherein the assumptions correspond to the one or more of (i) content to be included in the hypertext document, (ii) the layout for the hypertext document, or (iii) the parameters corresponding to behavior of the hypertext document; and
   generating, at one or more computer processors, hypertext document code or data for displaying the hypertext document, wherein generating the hypertext document code or data is based on the NL processing of the NL commands including the determined assumptions; and
   (C) analyzing, at one or more computer processors, existing hypertext document data; and
   (D) modifying, using one or more computer processors, the existing hypertext document data based on one or both of (i) the NL processing of the NL commands and (ii) the determined assumptions.

2. The method of claim 1, further comprising:
   creating, using one or more computer processors, the hypertext document.

3. The method of claim 1, further comprising:
   generating, at one or more computer processors, a request for content based on NL processing of an NL command;
   sending, via a communication network, the request to an external system; and
   receiving, at one or more computer processors, a response to the request;
   wherein generating hypertext document code or data includes using information in the response to the request.

4. The method of claim 1, further comprising:
   generating, at one or more computer processors, a request for NL processing of at least a portion of an NL command;
   sending, via a communication network, the request to an external system; and
   receiving, at one or more computer processors, a response to the request;
   wherein performing NL processing of the NL commands includes using information in the response to the request.

5. The method of claim 1, wherein generating hypertext document code comprises:
   selecting a type of hypertext document code from a plurality of alternative types of hypertext document code; and
   generating the hypertext document code according to the selected type.

6. A system for creating a hypertext document, comprising:
   one or more processors and one or more memories storing machine-readable instructions which, when executed by the one or more processors, cause the one or more processors:
   (A) to receive natural language (NL) commands describing one or more of (i) content of the hypertext document, (ii) a layout of the hypertext document, or (iii) behavior of the hypertext document;
   (B) to process the NL commands to generate expressions in a precise syntax;
   (C) to generate hypertext document data and code based on the expressions, wherein the generation of hypertext data and code includes determining:
   assumptions concerning (a) ambiguities associated with the NL commands and (b) information necessary for creating the hypertext document not specified by the NL commands, wherein the assumptions correspond to the one or more of (i) content to be included in the hypertext document, (ii) the layout for the hypertext document, or (iii) the parameters corresponding to behavior of the hypertext document,
   based on the expressions generated by the NL processing module and the assumptions, one or more of (i) content to be included in the hypertext document, (ii) a layout for the hypertext document, or (iii) parameters corresponding to behavior of the hypertext document; and
   hypertext code and/or data to (i) add the determined content to the hypertext document, (ii) create or modify the hypertext document according to the determined layout, and/or (iii) create or modify the hypertext document according to the determined parameters;
   (D) to write hypertext document data and code to a file;
   (E) to analyze existing hypertext document data and code in the file; and
   (F) to modify the existing hypertext document code and data in the file based on one or both of (i) the NL processing of the NL commands and (ii) the determined assumptions.

7. The system of claim 6, wherein the one or more memories storing machine-readable instructions, when executed by the one or more processors, cause the one or more processors to map NL commands to hypertext code and/or data.

8. The system of claim 6, wherein the one or more memories storing machine-readable instructions, when executed by the one or more processors, cause the one or more processors to:
   generate a request for content based on NL processing of an NL command;
   send the request to an external system;
   receive a response to the request; and
   use information in the response to the request to generate hypertext document code or data includes.

9. The system of claim 6, wherein the one or more memories storing machine-readable instructions, when executed by the one or more processors, cause the one or more processors to:
   generate a request for NL processing of at least a portion of an NL command;
   send the request to an external system;

receive a response to the request; and use information in the response to the request to perform NL processing of the NL commands includes.

10. The method of claim 6, wherein the one or more memories storing machine-readable instructions, when executed by the one or more processors, cause the one or more processors to:

select a type of hypertext document code from a plurality of alternative types of hypertext document code; and generate the hypertext document code according to the selected type.

11. A tangible, non-transitory computer readable medium or media storing instruction thereon that, when executed by one or more computer processors, cause the one or more computer processors to:

(A) receive natural language (NL) commands describing one or more of (i) content of the hypertext document, (ii) a layout of the hypertext document, or (iii) behavior of the hypertext document;

(B) perform NL processing of the NL commands to determine one or more of (i) content to be included in the hypertext document, (ii) a layout for the hypertext document, or (iii) parameters corresponding to behavior of the hypertext document, wherein performing the NL processing includes:

determining assumptions concerning (a) ambiguities associated with the NL commands and (b) information necessary for creating the hypertext document not specified by the NL commands, wherein the assumptions correspond to the one or more of (i) content to be included in the hypertext document, (ii) the layout for the hypertext document, or (iii) the parameters corresponding to behavior of the hypertext document; and generating hypertext document code or data for displaying the hypertext document, wherein generating the hypertext document code or data is based on the NL processing of the NL commands including the determined assumptions; and (C) analyze, at one or more computer processors, existing hypertext document data; and (D) modify, using one or more computer processors, the existing hypertext document data based on one or both of (i) the NL processing of the NL commands and (ii) the determined assumptions.

12. A method of modifying a hypertext document, comprising:

(A) receiving, at one or more computer processors, natural language (NL) commands describing one or more of (i) a change of content of the hypertext document, (ii) a change of layout of the hypertext document, or (iii) a change of behavior of the hypertext document;

(B) performing, at one or more computer processors, NL processing of the NL commands to determine one or more of (i) content to be included in the hypertext document or content in the hypertext document to be modified, (ii) a change to a layout of the hypertext document, or (iii) a change of parameters corresponding to behavior of the hypertext document, wherein performing the NL processing includes:

determining, at one or more computer processors, assumptions concerning (a) ambiguities associated with the NL commands and (b) information necessary for modifying the hypertext document not specified by the NL commands, wherein the assumptions correspond to the one or more of (i) content to be included in the hypertext document or content in the hypertext document that is to be modified, (ii) the change of the layout for the hypertext document, or (iii) the change of the parameters corresponding to behavior of the hypertext document; and generating, at one or more computer processors, hypertext document code or data for displaying the hypertext document, wherein generating the hypertext code or data is based on the NL processing of the NL commands including the determined assumptions; and (C) analyzing, at one or more computer processors, existing hypertext document data; and (D) modifying, using one or more computer processors, hypertext document code or data in the hypertext document, wherein modifying the hypertext document code or data is based on the NL processing of the NL commands including the determined assumptions.

13. A system for creating a hypertext document, comprising:

one or more processors and one or more memories storing machine-readable instructions which, when executed by the one or more processors, cause the one or more processors:

(A) to receive natural language (NL) commands describing one or more of (i) a change of content of the hypertext document, (ii) a change of layout of the hypertext document, or (iii) a change of behavior of the hypertext document;

(B) to process the NL commands to generate expressions in a precise syntax; and (C) to generate hypertext document data and code based on the expressions, wherein the generation of hypertext data and code includes determining:

assumptions concerning (a) ambiguities associated with the NL commands and (b) information necessary for modifying the hypertext document not specified by the NL commands, wherein the assumptions correspond to the one or more of (i) content to be included in the hypertext document or content in the hypertext document that is to be modified, (ii) the change of the layout for the hypertext document, or (iii) the change of the parameters corresponding to behavior of the hypertext document, based on the expressions generated by the NL processing module and the assumptions, one or more of (i) content to be included in the hypertext document or content in the hypertext document to be modified, (ii) a change in the layout of the hypertext document, or (iii) changes in parameters corresponding to behavior of the hypertext document; and hypertext code and/or data to (i) add determined content to the hypertext document or modify existing content, (ii) modify the hypertext document according to the determined change in the layout, and/or (iii) modify parameters in the hypertext document according to the determined changes in parameters;

(D) to write hypertext document data and code to a file;

(E) to analyze existing hypertext document data and code in the file; and (F) to modify the existing hypertext code and data in the file based on one or both of (i) the NL processing of NL commands and (ii) the determined assumptions.

14. A tangible, non-transitory computer readable medium or media storing instruction thereon that, when executed by one or more computer processors, cause the one or more computer processors to:

(A) receive natural language (NL) commands describing one or more of (i) a change of content of the hypertext document, (ii) a change of layout of the hypertext document, or (iii) a change of behavior of the hypertext document;
(B) perform NL processing of the NL commands to determine one or more of (i) content to be included in the hypertext document or content in the hypertext document to be modified, (ii) a change to a layout of the hypertext document, or (iii) a change of parameters corresponding to behavior of the hypertext document, wherein performing the NL processing includes:
determining assumptions concerning (a) ambiguities associated with the NL commands and (b) information necessary for modifying the hypertext document not specified by the NL commands, wherein the assumptions correspond to the one or more of (i) content to be included in the hypertext document or content in the hypertext document that is to be modified, (ii) the change of the layout for the hypertext document, or (iii) the change of the parameters corresponding to behavior of the hypertext document; and
generating hypertext document code or data for displaying the hypertext document, wherein generating the hypertext document code or data is based on the NL processing of the NL commands including the determined assumptions; and
(C) analyze existing hypertext document data; and
(D) modify hypertext document code or data in the hypertext document, wherein modifying the hypertext document code or data is based on the NL processing of the NL commands including the determined assumptions.

* * * * *